May 27, 1924.  1,495,736
F. S. HADLEY
PROCESS FOR COOKING
Filed Sept. 29, 1922
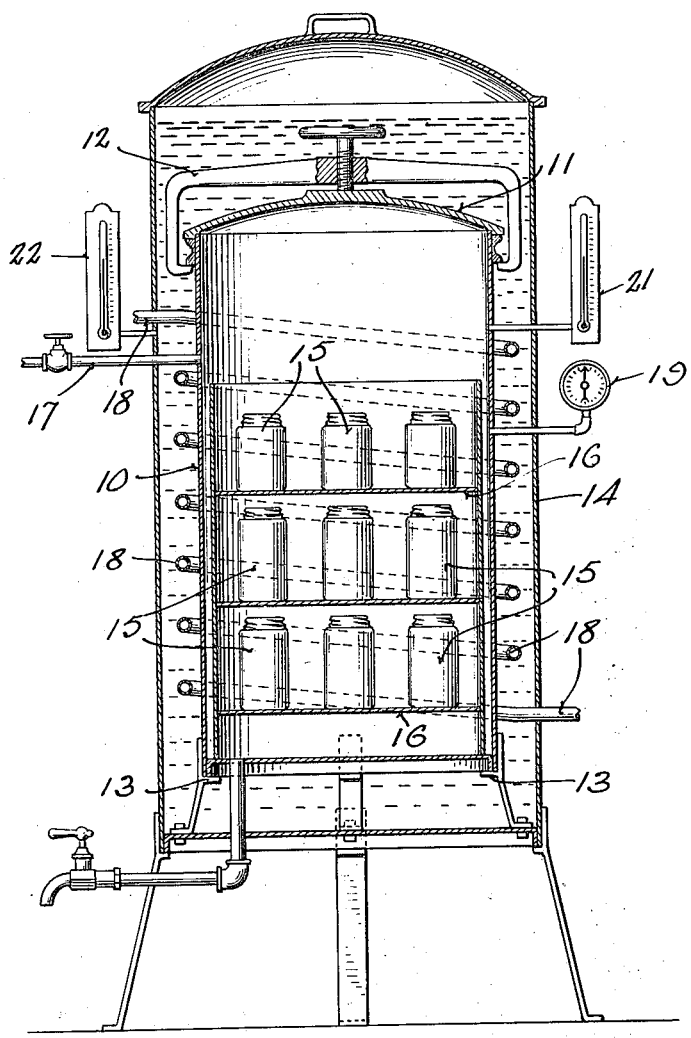
INVENTOR.
FREDERICK S. HADLEY
BY
ATTORNEY.

Patented May 27, 1924.

1,495,736

UNITED STATES PATENT OFFICE.

FREDERICK S. HADLEY, OF MILWAUKEE, WISCONSIN.

PROCESS FOR COOKING.

Application filed September 29, 1922. Serial No. 591,229.

*To all whom it may concern:*

Be it known that I, FREDERICK S. HADLEY, a citizen of the United States, residing at Milwaukee, in the county of Milwaukee and State of Wisconsin, have invented a certain new and useful Improvement in Processes for Cooking, of which the following is a full, clear, concise, and exact description, reference being had to the accompanying drawings, forming a part of this specification.

This invention relates to the preparation of foods and, though capable of a more general use, is primarily concerned with a novel process for the treatment of cereal starches, such as barley, navy beans and the like, by which these may be rendered easily digestible and well adapted for consumption by convalescents, as well as persons of good physical health.

It is generally recognized that the cereals and, particularly those named, possess very high and wonderful nutritive values. Yet they are not ordinarily considered proper food for other than strong and healthy persons, because of the inability to reduce them to a readily digestible state by cooking processes heretofore practiced.

The cereals in the raw state are made up of minute particles or cells of starch, each entirely encased within hard walls, of silicious material which are, in a large degree, impenetrable by the juices of the digestive organs. In fact, many of these cells pass through the stomach and small intestines into the large intestines, where, if they break at all, it is because of the absorption of moisture and body heat. This delay in the breaking down of the cell walls results in fermentation due to the absence of enzymes within the large intestines capable of acting upon the raw starch exposed therein, thus giving rise to pathological conditions. The physical structure of the various starch foods are quite similar in this respect, except that in some the silicious cell walls are more readily broken down than in others. For instance, the silicious cell walls of the vegetable starches, such as potatoes, beans, peas, etc., are weaker than those of the cereal starches, and there is a wide range of difference in this respect between the starches in the cereal group.

So far as I am aware, no process has been heretofore devised which is capable of successfully and completely breaking down the cell walls of all of the cereal starches, particularly navy beans and barley, without subjecting them to temperatures so high as to materially impair the nutritive value thereof. Temperatures ranging considerably above 212° F. have heretofore been employed in an attempt to break down the cell walls in some of these starches. But at such temperatures, chemical reactions set in which tend to destroy or at least impair their nutritive value.

The general aim of the present invention is to provide a novel process by which the cell walls of starch foods of various species may be completely broken down without the use of high temperatures, the food being thus rendered easily digestible and its original nutritive value retained. In accomplishing this, I rely wholly upon the mechanical hammering effect of the molecules of the cooking medium against the cell walls of the food. I have found that the intensity and effectiveness of this molecular attack depends, not alone upon the temperature of the cooking medium, but also upon the density of the medium and upon the pressure applied thereto. Thus, I select a liquid, preferably water, as a cooking medium, and during the process subject the water to a pressure and temperature dependent upon the character of the food substance under treatment. In some instances, pressures as high as sixty pounds per square inch, more or less, are employed while the temperature for any given case may be between 150° and 212° F.

As illustrative of the present invention, I shall describe, in particular, a process by which I have successfully rendered very easily digestible such cereal starches as navy beans.

The beans are first immersed in water, at ordinary temperature, and permitted to soak until thoroughly saturated, that is, until the water is in intimate contact with the starch cells throughout the body of the beans. This soaking ordinarily requires from five to eight hours. The beans so immersed are then placed in a closed vessel and subjected to a pressure of upwards of sixty pounds per square inch and to a temperature substantially lower than 212° F., 200° F. being a good temperature for cooking beans. During the entire cooking process, which ordinarily requires, in the case of beans, about eight hours, the pressure and temperature are preferably maintained substantially constant.

I have found that by treating navy beans in this way, the cell walls are completely broken down and the beans are actually reduced to a condition appropriate for consumption, in substantial quantities, by convalescents as well as persons in good physical health. Furthermore, the nutritive value of the beans is in no way impaired because the cooking temperature is well below that at which destructive chemical reaction sets in. I have also found that beans treated in this manner may be kept, without spoiling, for as long as twelve days or more in an ordinary ice box.

This process has also been successfully applied to other foods, such as vegetables, fruits and meats, with similar results, the pressures and temperatures employed being dependent upon the character of food treated. In each instance, however, I have used water as a cooking medium. Water or other liquid medium, rather than an aeriform medium, is employed because of its greater density and consequent increased effectiveness upon the food treated. This increased effectiveness of the liquid medium over the aeriform medium is explained by the fact that, within the liquid medium there are a greater number of molecules per unit of volume and that the mechanical effect of the molecular action upon the substance treated is correspondingly greater.

An apparatus well adapted for carrying out the method above described is diagrammatically illustrated in the single figure of the drawing.

This apparatus includes a vessel 10 of air tight construction and capable of withstanding operating pressures as high as sixty or even one hundred pounds per square inch. The cover 11 of this vessel is removably clamped thereon by means of an appropriate clamp 12. The vessel 10 is supported upon a suitable bracket 13 within an outer container 14 so that the top, bottom and side walls of the vessel are well spaced from the corresponding parts of the container.

In practice, the food to be treated is placed in jars 15 or other appropriate containers, the contents of each jar being completely covered with water. These jars are placed on suitable trays 16 within the vessel 10, the cover 11 is clamped thereon and air pumped into the vessel through the pipe 17 until the desired pressure has been attained. The outer container 14 is then substantially filled with water so that the vessel 10 is completely immersed. Heat is then applied by the admission of steam through an appropriate coil 18 surrounding the vessel. The fact that the vessel 10 is completely enclosed in a water jacket renders it easy to maintain the temperature within the vessel substantially constant and uniform throughout. The vessel 10 may be equipped with a pressure gauge 19 of any appropriate type and thermometers 20 and 21 may be applied to the vessel 10 and container 14 to guide the operator in carrying out the process.

The apparatus just described is fully disclosed in my copending application, Serial No. 507,456, filed October 13, 1921, so that a further or more detailed description thereof at this time is deemed unnecessary.

Various modifications may be made in the process hereinabove specifically described, without departing from or sacrificing any of the advantages of the invention as defined in the appended claims.

1. The method of preparing food which consists in heating the food substance in a liquid medium under pressure to intensify the molecular action thereof against the cell structure of the food and at a relatively low temperature below that at which destructive chemical action sets in.

2. The method of preparing food which consists in soaking the food substance in a liquid and thereafter heating the same in a liquid under pressure to intensify the molecular attack thereof against the cell structure of the food and at a relatively low temperature below that at which destructive chemical action sets in.

3. The method of preparing food which consists in cooking the food at a uniform temperature substantially below 212° F. in a liquid medium under pressure.

4. The method of preparing food which consists in soaking the food substance in a liquid and thereafter cooking the same at a uniform temperature substantially below 212° F. in a liquid under pressure.

5. The method of treating cereal starches which consists in soaking the same in water, at normal temperatures, for several hours, and then cooking the same for several hours at a uniform temperature substantially below 212° F. in a liquid medium under pressure.

6. The method of preparing food which consists in immersing the food substance in a liquid and subjecting said liquid to a pressure substantially greater than that of the atmosphere and to a temperature substantially below 212° F.

7. The method of preparing food which consists in soaking the food substance in a liquid at normal temperature, and then subjecting said liquid to a pressure substantially greater than that of the atmosphere and to a temperature substantially less than 212° F. for several hours.

In witness whereof, I hereunto subscribe my name this 27th day of September, 1922.

FREDERICK S. HADLEY.